(12) United States Patent
Huang

(10) Patent No.: US 9,674,687 B2
(45) Date of Patent: Jun. 6, 2017

(54) VENDOR-SPECIFIC DOCKING MANAGEMENT OPERATIONS

(71) Applicant: QUALCOMM Incorporated, San Diego, CA (US)

(72) Inventor: Xiaolong Huang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/607,327

(22) Filed: Jan. 28, 2015

(65) Prior Publication Data

US 2015/0271658 A1 Sep. 24, 2015

Related U.S. Application Data

(60) Provisional application No. 61/969,699, filed on Mar. 24, 2014.

(51) Int. Cl.
| | |
|---|---|
| *H04B 7/24* | (2006.01) |
| *H04W 8/00* | (2009.01) |
| *G06Q 30/06* | (2012.01) |
| *H04L 29/08* | (2006.01) |
| *G06F 13/40* | (2006.01) |
| *H04W 84/12* | (2009.01) |

(52) U.S. Cl.
CPC ........ *H04W 8/005* (2013.01); *G06F 13/4004* (2013.01); *G06Q 30/0601* (2013.01); *H04L 67/12* (2013.01); *H04L 67/16* (2013.01); *H04W 84/12* (2013.01)

(58) Field of Classification Search
CPC ... H04W 8/005; H04W 84/12; G06Q 30/0601
USPC ................................ 455/39, 41.1, 41.2, 41.3
See application file for complete search history.

(56) References Cited

U.S. PATENT DOCUMENTS

| | | | | |
|---|---|---|---|---|
| 2012/0265913 | A1* | 10/2012 | Suumaki ............... | H04W 4/008 710/303 |
| 2013/0252548 | A1* | 9/2013 | Levy ................. | H04W 52/0216 455/41.2 |
| 2014/0010220 | A1* | 1/2014 | Huang ..................... | H04B 7/24 370/338 |
| 2014/0075523 | A1* | 3/2014 | Tuomaala ............. | H04L 63/083 726/6 |
| 2014/0201415 | A1* | 7/2014 | Huang ................... | G06F 13/00 710/303 |

(Continued)

OTHER PUBLICATIONS

ISA/EPO, International Search Report and the Written Opinion of the International Searching Authority, Int'l. App. No. PCT/US2015/013475, Apr. 1, 2015, European Patent Office, Rijswijk, NL, 8 pgs.

(Continued)

*Primary Examiner* — M D Talukder
(74) *Attorney, Agent, or Firm* — Holland & Hart LLP

(57) ABSTRACT

A wireless dockee may access a vendor-specific feature available on a peripheral device in communication with a wireless docking center. Information regarding the vendor-specific feature may be communicated by the wireless docking center to the wireless dockee both during pre-association discovery as well as via a service description that corresponds with the vendor-specific feature. The wireless dockee may use the received information to generate an access request to the peripheral device.

27 Claims, 12 Drawing Sheets

(56) References Cited

U.S. PATENT DOCUMENTS

| | | | |
|---|---|---|---|
| 2014/0206346 A1* | 7/2014 | Kiukkonen | H04W 52/0229 455/426.1 |
| 2014/0351477 A1* | 11/2014 | Lee | G06F 1/1632 710/303 |
| 2014/0351478 A1* | 11/2014 | Lee | H04W 4/08 710/303 |
| 2015/0016417 A1* | 1/2015 | Dees | G06F 1/1698 370/331 |
| 2015/0056920 A1* | 2/2015 | Huttunen | H04B 7/26 455/41.2 |
| 2015/0257183 A1* | 9/2015 | Pentelka | H04M 1/7253 455/41.2 |
| 2015/0271658 A1* | 9/2015 | Huang | H04W 8/005 455/39 |
| 2015/0296552 A1* | 10/2015 | Huang | H04W 76/023 370/252 |

OTHER PUBLICATIONS

Ritchie, "MediaServer:1 Device Template Version 1.01," for UPnP™ Version 1.0, Standardized DCP, Jun. 25, 2002, 11 pgs., XP003019403, internet citation from URL: http://www.ieeexplore.ieee.org/xpl/absprinff.jsp?arnumber=137598, Contributing Members of the UPnP™ Forum.

* cited by examiner

VENDOR-SPECIFIC DOCKING MANAGEMENT OPERATIONS

CROSS REFERENCES

The present Application for Patent claims priority to U.S. Provisional Patent Application No. 61/969,699 by Huang et al., entitled "Vendor-Specific Docking Management Operations," filed Mar. 24, 2014, and assigned to the assignee hereof.

BACKGROUND

Field of the Disclosure

The present disclosure relates generally to wireless communication systems, and more particularly to vendor-specific docking management operations.

Description of the Related Art

Wireless docking centers (WDCs), which are also referred to as docking stations, wireless docking stations, or docks, may be used to wirelessly connect an electronic device such as a computer to various peripheral devices, including monitors, keyboards, mice, printers, scanners, cameras, and the like. The electronic devices connected with the peripheral devices through a WDC may include laptop computers, notebook computers, netbooks, tablets, smartphones, personal digital assistants (PDAs), and other similar electronic devices. These electronic devices are able to "dock" with a WDC and are thus also referred to as wireless dockees (WDs).

In some cases, a peripheral device may be connected to a WDC, thus allowing the features of the peripheral device to be made available to potential wireless dockees. The peripheral device may include generic features, but may also include vendor-specific features. In order to access the vendor-specific features, both the wireless dockee and the WDC should be able to communicate with the peripheral device in a way that is understandable to the peripheral device, even if vendor-specific message parameters are required.

SUMMARY

The described features generally relate to methods, systems, and/apparatuses for allowing a wireless dockee to access a vendor-specific feature available on a peripheral device in communication with a wireless docking center (WDC). Information regarding the vendor-specific feature may be communicated by the WDC to the wireless dockee both during pre-association discovery as well as via a service description that corresponds with the vendor-specific feature. The wireless dockee may use the received information to generate an access request to the peripheral device.

According to a first set of illustrative embodiments, a method of wireless communication may include detecting, during pre-association discovery between a wireless dockee and a WDC, a peripheral device that is in communication with the WDC and that includes a vendor-specific feature. The method may also include receiving a service description corresponding to the vendor-specific feature and accessing the vendor-specific feature in accordance with the service description. In certain examples, the method may also include receiving, during the pre-association discovery, a feature identifier which identifies the vendor-specific feature and a vendor identifier which identifies a vendor associated with the vendor-specific feature. The vendor identifier may include an organization unique identifier (OUI) of the vendor. Additionally, the vendor identifier and the feature identifier may be received in an extensible markup language (XML) format.

In certain examples, the service description may include a Universal Plug and Play (UPnP) service description. The service description may also include at least one of procedures associated with the vendor-specific feature. The at least one of the procedures associated with the vendor-specific feature may be based on a vendor-specific data type. The at least one of the procedures associated with the vendor-specific feature may include input and/or output parameters that identify a vendor associated with the at least one of the procedures. The vendor may be identified by an OUI.

In other examples, the method may include receiving, as part of the service description, a procedure associated with the vendor-specific feature that is based on a vendor-specific data type. The method may further include accessing a schema that defines the vendor-specific data type. The vendor-specific data type may be defined using XML, and may be defined to include a generic element and a vendor-specific element. Additionally, the vendor-specific data type may be defined to include a vendor identifier, which may be an OUI of the vendor. In certain examples, the method may further include generating a UPnP packet based on the schema. The UPnP packet may be used to access the vendor-specific feature.

In yet other examples, the method may further include comparing a set of vendor-specific features supported by the wireless dockee with a set of vendor-specific features supported by the WDC to determine a set of vendor-specific peripheral device features supported by both the wireless dockee and the WDC.

According to a second set of illustrative embodiments, an apparatus for wireless communication may include at least one processor and a memory coupled to the at least one processor. The apparatus may also include a receiver to detect, during pre-association discovery between a wireless dockee and a WDC, a vendor-specific feature of a peripheral device that is in communication with the WDC, and to receive and store in the memory a service description corresponding to the vendor-specific feature. A transmitter to transmit an access request to the peripheral device via the WDC to access the vendor-specific feature in accordance with the service description may also be included.

In certain examples, the receiver may receive, during the pre-association discovery, a feature identifier which identifies the vendor-specific feature and a vendor identifier which identifies a vendor associated with the vendor-specific feature. The receiver may receive the vendor identifier as an OUI of the vendor, and may also receive the vendor identifier and the feature identifier in an XML format.

In other examples, the receiver may receive, as part of the service description, a procedure associated with the vendor-specific feature that is based on a vendor-specific data type. The apparatus may further include a schema accessor to access a schema that defines the vendor-specific data type. Additionally, the transmitter may generate the access request based on the schema.

According to another set of illustrative embodiments, an apparatus for wireless communication may include means for detecting, during pre-association discovery between a wireless dockee and a WDC, a peripheral device that is in communication with the WDC and that includes a vendor-specific feature, means for receiving a service description corresponding to the vendor-specific feature, and means for accessing the vendor-specific feature in accordance with the service description.

According to yet another set of illustrative embodiments, a computer program product may include a non-transitory computer-readable medium having non-transitory program code recorded thereon. The non-transitory program code may include program code to detect, during pre-association discovery between a wireless dockee and a WDC, a peripheral device that is in communication with the WDC and that includes a vendor-specific feature. The non-transitory program code may also include program code to receive a service description corresponding to the vendor-specific feature, and program code to access the vendor-specific feature in accordance with the service description.

According to an additional set of illustrative embodiments, a method of wireless communication may include communicating, during pre-association discovery between a wireless dockee and a WDC, an identification of a vendor-specific feature available from a peripheral device that is in communication with the WDC. The method may also include transmitting a service description corresponding to the vendor-specific feature, and facilitating access to the vendor-specific feature in accordance with the service description. Additionally, the method may include communicating, during the pre-association discovery, a feature identifier which identifies the vendor-specific feature and a vendor identifier which identifies a vendor associated with the vendor-specific feature. The vendor identifier may include an OUI of the vendor. The vendor identifier and the feature identifier may be received in an XML format.

In certain examples, the service description may include a UPnP service description. The service description may also include at least one of procedures associated with the vendor-specific feature. The at least one of the procedures associated with the vendor-specific feature may be based on a vendor-specific data type. The at least one of the procedures associated with the vendor-specific feature may include input and/or output parameters that identify a vendor associated with the at least one of the procedures. The vendor may be identified by an OUI.

In certain examples, the method may further include transmitting, as part of the service description, a procedure associated with the vendor-specific feature that is based on a vendor-specific data type.

According to another set of illustrative embodiments, an apparatus for wireless communication may include at least one processor and a memory coupled to the at least one processor. The apparatus may also include a transmitter to communicate, during pre-association discovery between a wireless dockee and a WDC, a vendor-specific feature of a peripheral device that is in communication with the WDC, and to transmit a service description corresponding to the vendor-specific feature.

In certain examples, the transmitter may transmit, during the pre-association discovery, a feature identifier which identifies the vendor-specific feature and a vendor identifier which identifies a vendor associated with the vendor-specific feature. The transmitter may transmit the vendor identifier as an OUI of the vendor. Additionally, the transmitter may transmit the vendor identifier and the feature identifier in an XML format. In other examples, the transmitter may transmit, as part of the service description, a procedure associated with the vendor-specific feature that is based on a vendor-specific data type.

According to yet another set of illustrative embodiments, an apparatus for wireless communication may include means for communicating, during pre-association discovery between a wireless dockee and a WDC, an identification of a vendor-specific feature available from a peripheral device that is in communication with the WDC, means for transmitting a service description corresponding to the vendor-specific feature, and means for facilitating access to the vendor-specific feature in accordance with the service description.

According to still another set of illustrative embodiments, a computer program product may include a non-transitory computer-readable medium having non-transitory program code recorded thereon. The non-transitory program code may include program code to communicate, during pre-association discovery between a wireless dockee and a WDC, an identification of a vendor-specific feature available from a peripheral device that is in communication with the WDC. The non-transitory program code may also include program code to transmit a service description corresponding to the vendor-specific feature, and program code to facilitate access to the vendor-specific feature in accordance with the service description.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and apparatuses are described for allowing a wireless dockee to access a vendor-specific feature available on a peripheral device in communication with a wireless docketing center (WDC). Information regarding the vendor-specific feature may be communicated by the WDC to the wireless dockee both during pre-association discovery as well as via a service description that corresponds with the vendor-specific feature. The wireless dockee may use the received information to generate an access request to the peripheral device.

The various techniques described herein for allowing access by a wireless dockee to vendor-specific features on a peripheral device are generally described with respect to wireless local area network (WLAN) or wireless fidelity (Wi-Fi) networks. A WLAN or Wi-Fi network may refer to a network that is based on the protocols described in the various IEEE 802.11 standards (e.g., IEEE 802.11a/g, 802.11n, 802.11ac, 802.11 ad, 802.11ah, etc.), for example. However, the same or similar techniques may also be used in any wireless network (e.g., a cellular network). For example, the same or similar techniques may be used for various wireless communications systems such as cellular wireless systems, Peer-to-Peer wireless communications, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of radio communication technologies called a Radio Access Technology (RAT). A wireless communications system or network that implements a Radio Access Technology may be called a Radio Access Network (RAN).

Thus, the following description provides examples, and is not limiting of the scope, applicability, or configuration set forth in the claims. Changes may be made in the function and arrangement of elements discussed without departing from the concepts disclosed herein. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
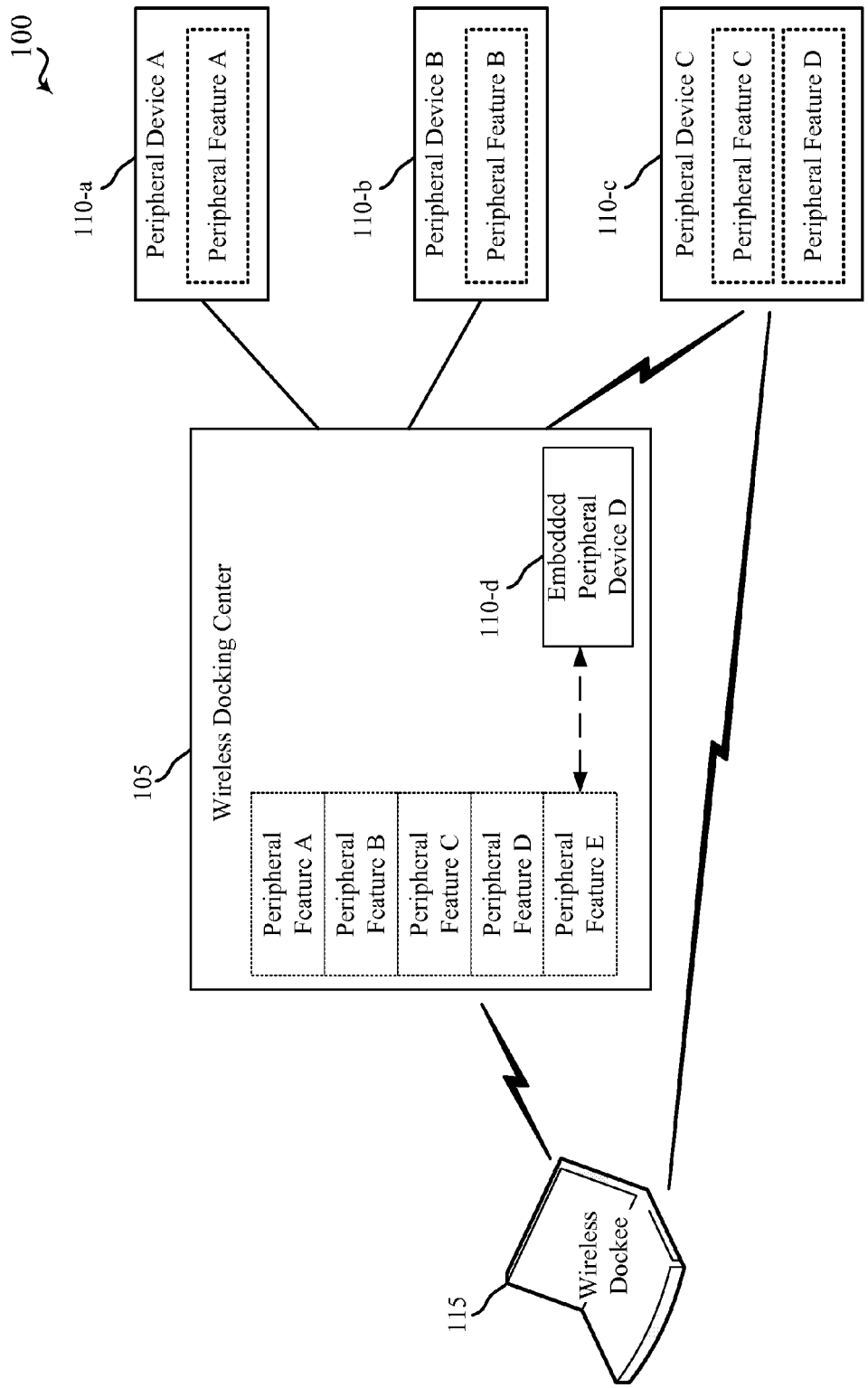
FIG. 1 shows a block diagram of a wireless communications system according to various aspects of the present disclosure.

Referring first to FIG. 1, a block diagram illustrates a wireless communications system 100 according to various aspects of the present disclosure. The wireless communications system 100 includes a wireless docking center 105, peripheral devices 110, and a wireless dockee 115. The peripheral devices 110 may be electronic devices that each have at least one peripheral feature. For example, the peripheral device 110-*a* may be a mouse with a peripheral feature of controlling a pointer on a graphical user interface. In some embodiments, the peripheral device 110-*b* is a keyboard with a peripheral feature of user input. The peripheral device 110-*c* may be a multi-function printer, for example, with peripheral features of printing and scanning. Additionally or alternatively, the wireless docking center 105 may include embedded peripheral devices, such as the peripheral device 110-*d*. Some or all of the peripheral devices 110 may be connected to and/or in communication with the wireless docking center 105.

The wireless dockee 115 may wirelessly connect to the wireless docking center 105, for example, utilizing Wi-Fi. The wireless dockee 115 may seek out or connect to the wireless docking center 105 based on the peripheral features available via the wireless docking center 105. Thus, the wireless docking center 105 may advertise the peripheral features, and thus the peripheral devices, available to a wireless dockee 115. Once connected to (e.g., docked) to the wireless docking center 105, the wireless dockee 115 may exploit the peripheral features available through the wireless docking center 105.

The wireless docking center 105 may support a variety of known and/or common peripheral function protocols (PFPs). For example, the wireless docking center 105 may support Miracast, universal serial bus (USB), IEEE 802.11 ad ("WiGig"), Universal Plug and Play (UPnP), and/or Wi-Fi Direct Services Application Service Platform (WFDS ASP). Some of the peripheral devices 110 may employ such known PFPs, and the wireless docking center 105 may thus readily transmit discovery information related to these peripheral devices 110 to the wireless dockee 115. Information transmitted from the peripheral devices 110 to the wireless docking center 105 may include the identification of features available through the peripheral devices 110. Available features may include both generic features as well as vendor-specific features.

Figure 2:
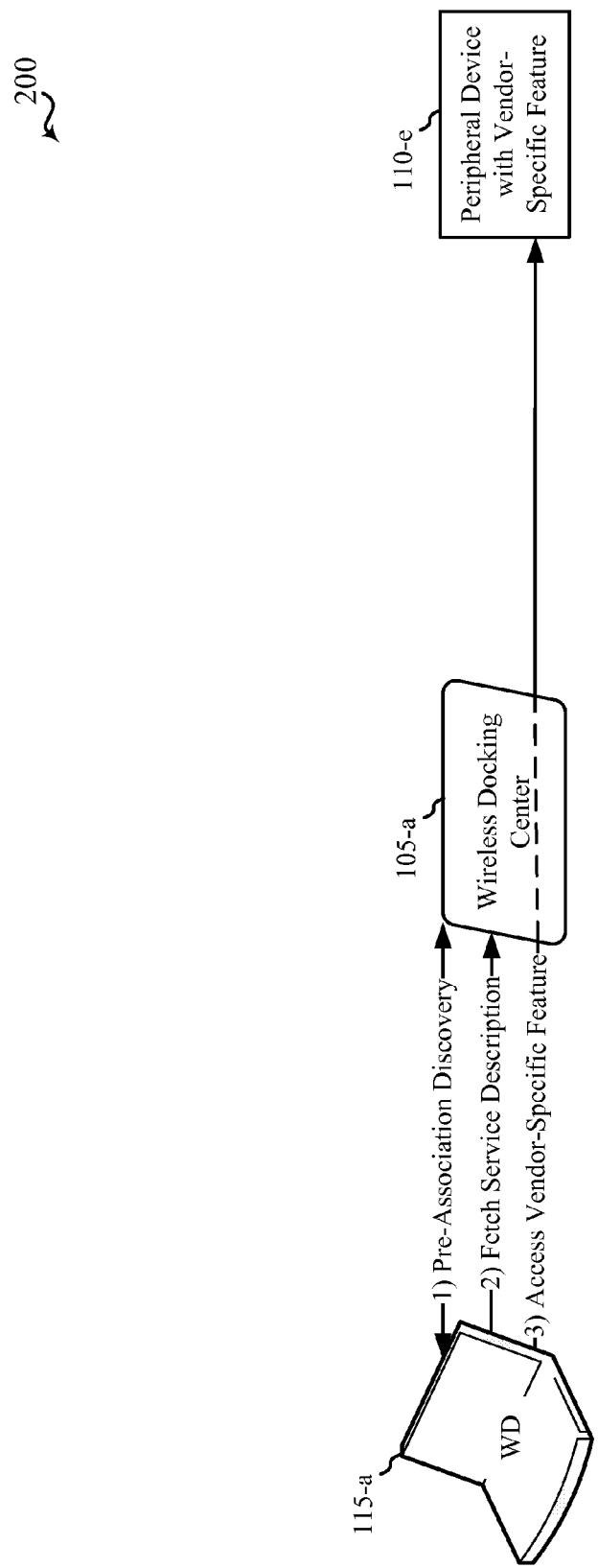
FIG. 2 shows a block diagram of a wireless communications system according to various aspects of the present disclosure.

Next, turning to FIG. 2, a block diagram shows a wireless communications system 200 according to various aspects of the present disclosure. The wireless communications system 200 may be an example of aspects of the wireless communications system 100. The wireless communications system 200 includes a wireless docking center 105-*a*, a peripheral device 110-*e*, and a wireless dockee 115-*a*. Each of these may be examples of the corresponding devices of the wireless communications system 100.

In some embodiments, the peripheral device 110-*e* is a peripheral device that includes a vendor-specific feature. The peripheral device 110-*e* may be external to the wireless docking center 105-*a*, or it may be embedded in the wireless docking center 105-*a*. The wireless docking center 105-*a* may receive from the peripheral device 110-*e* an identification of the features available on the peripheral device 110-*e*, including both generic and vendor-specific features. The wireless dockee 115-*a* may first become aware of the available features during pre-association discovery between the wireless dockee 115-*a* and the wireless docking center 105-*a*. Pre-association discovery occurs before the wireless dockee 115-*a* connects or associates with the wireless docking center 105-*a*, and allows the wireless dockee 115-*a* a period of time in which to identify the features available through the wireless docking center 105-*a*. If, as a result of the discovery information broadcast by the wireless docking center 105-*a* the wireless dockee 115-*a* determines that association with the wireless docking center 105-*a* would be beneficial, then the wireless dockee 115-*a* will associate with the wireless docking center 105-*a* and then receive additional information that facilitates communication with the connected peripheral device 110-*e*.

As an example, and as illustrated in FIG. 2, the wireless dockee 115-*a* first engages in pre-association discovery with the wireless docking center 105-*a*. During the pre-association discovery, the wireless dockee 115-*a* receives information from the wireless docking center 105-*a* that identifies the features available through the connected peripheral device 110-*e*. The available features may include vendor-specific features. The vendor-specific features may include, for example, scanning, printing, mouse, trackpad or keyboard features, as well as other input/output features. If the wireless dockee 115-*a* is compatible with an identified vendor, then the wireless dockee 115-*a* may associate with the wireless docking center 105-*a* to gain access to the vendor-specific feature.

Once associated, the wireless dockee 115-*a* may fetch or request a service description that relates to at least one of the vendor-specific features available through the peripheral device 110-*e*. The service description may be retrieved or received from the wireless docking center 105-*a*. The service description may include an identification of the procedures or actions available with the vendor-specific feature. A vendor-specific feature may include many actions or procedures. By way of example, a vendor-specific scanning feature may include multiple procedures such as scanning, scanning and printing, resizing, cropping, etc. The service description may be used to describe each of these procedures. For each procedure, the service description may include an identification of the parameters required to carry out each procedure, as well as an identification of the type or data structure for each parameter. Some parameters may include vendor-specific data structures. If the wireless dockee 115-*a* is compatible with the vendor, the wireless dockee 115-*a* may already have access to the definitions of the different vendor-specific types or data structures. The vendor-specific types or data structures may be defined in a vendor-specific schema that may already be present on the wireless dockee 115-*a*. Alternatively, the wireless dockee 115-*a* may obtain the vendor-specific schema from, for example, the vendor or other sources.

Once the wireless dockee 115-*a* has obtained the service description for the various procedures available for a vendor-specific feature, the wireless dockee 115-*a* may prepare and transmit an access request seeking access to one of the procedures associated with the vendor-specific feature. The access request may be generated in accordance with the service description received from the wireless docking center 105-*a* as well as with the vendor-specific schema.

The wireless docking center 105-*a*, the peripheral device 110-*e*, and the wireless dockee 115-*a* may employ a networking protocol for requesting and exchanging discovery information. In various embodiments, the devices may utilize UPnP, WFDS ASP, and/or Extensible Mark-up Language (XML). The various parameters and discovery information may thus occupy specific elements of sub-elements of a WFDS APS or XML string. By way of example, and as described in greater detail below, a complex XML type "VendorSpecificFeatureType" may identify a list of supported vendor-specific features and may be used by the wireless docking center 105-*a* during pre-association discovery to advertise its list of supported vendor-specific features. A complex XML type "VendorSpecificDataType" may be used by the wireless dockee 115-*a* to carry vendor-specific input parameters for a procedure associated with the vendor-specific feature. The wireless docking center 105-*a* may also use the "VendorSpecificDataType" to carry vendor-specific output parameters. The complex XML type "VendorXyzInfoType" may define an XML schema for vendor "Xyz." Additional details of these examples are described below with respect to FIGS. 3 and 4.

Figure 3:
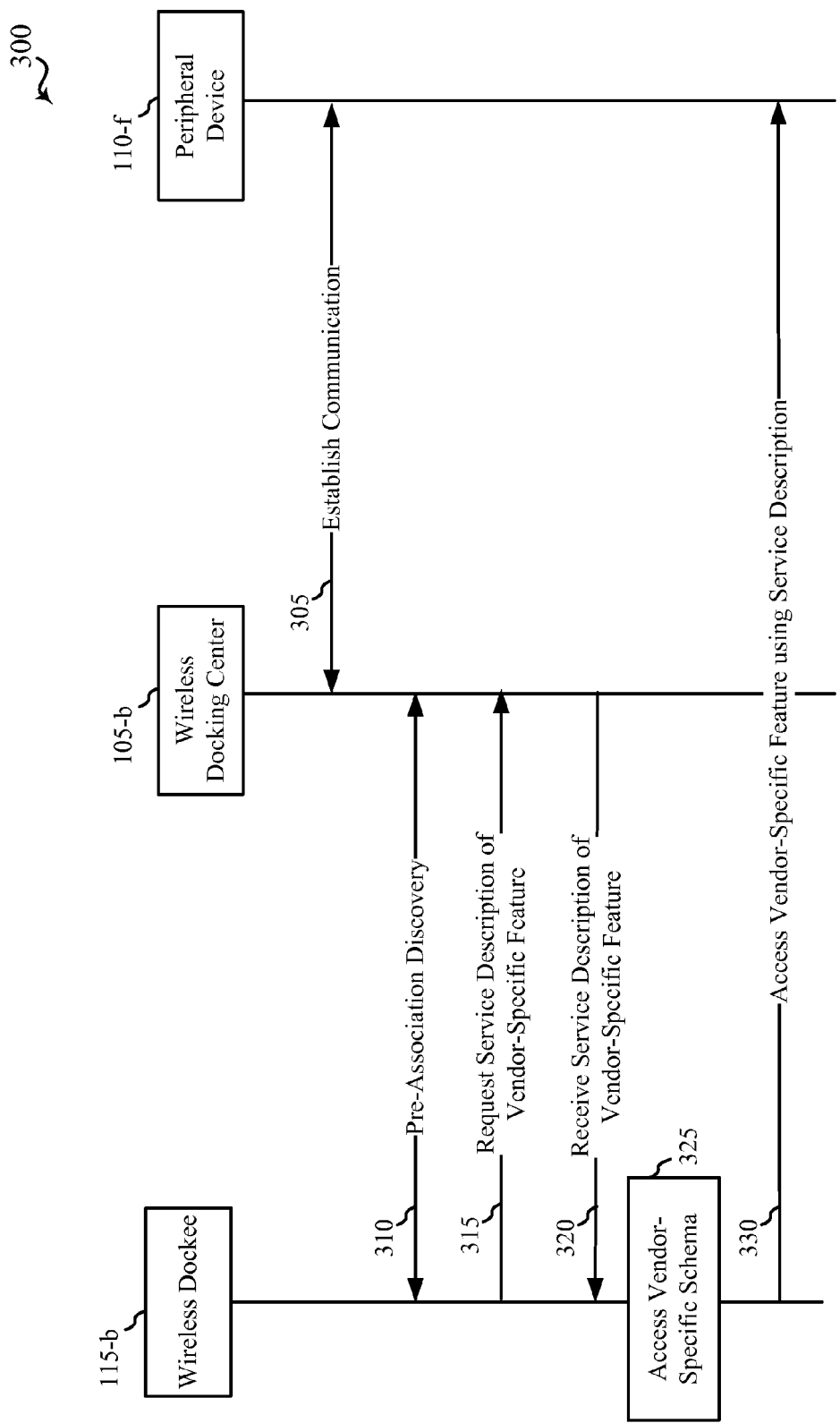
FIG. 3 shows a call flow diagram illustrating communication in a wireless communications system according to various aspects of the present disclosure.

FIG. 3 is a call flow diagram 300 illustrating communication in a wireless communications system according to various aspects of the present disclosure. The diagram 300 may illustrate aspects of the wireless communications systems 100 and 200 described with reference to FIGS. 1 and 2. The diagram 300 includes a wireless docking center 105-*b*, a peripheral device 110-*f*, and a wireless dockee 115-*b*. Each of these may be examples of corresponding devices of wireless communications systems 100 and 200.

The wireless docking center 105-*b* may establish communication 305 with the peripheral device 110-*f*. The peripheral device 110-*f* may be external to or embedded in the wireless docking center 105-*b*. Upon establishing communication 305, the wireless docking center 105-*b* may determine that the peripheral device 110-*f* includes vendor-specific features. Thus, during pre-association discovery 310, the wireless docking center 105-*b* advertises the vendor-specific features available through peripheral device 110-*f*. Wireless dockee 115-*b* determines that it is compatible with the identified vendor and thus transmits a request 315 for a service description for the vendor-specific feature of interest. The wireless docking center 105-*b* receives the request 315 and transmits a response 320 that includes the service description. The wireless dockee 115-*b* uses the service description to identify the available procedures associated with the vendor-specific feature, as well as the input parameters used to access the procedures. The service description also identifies the type of each of the input parameters. In the case that at least one of the input parameters are of a vendor-specific type, the wireless dockee 115-*b* accesses a vendor specific schema that defines the vendor-specific types (at box 325). Thus, using the service description and the vendor-specific schema, the wireless dockee 115-*b* is able to generate an access request 330 that may be understood by the peripheral device 110-*f*. The wireless dockee 115-*b* transmits the access request 330 to the peripheral device 110-*f*.

Figure 4:
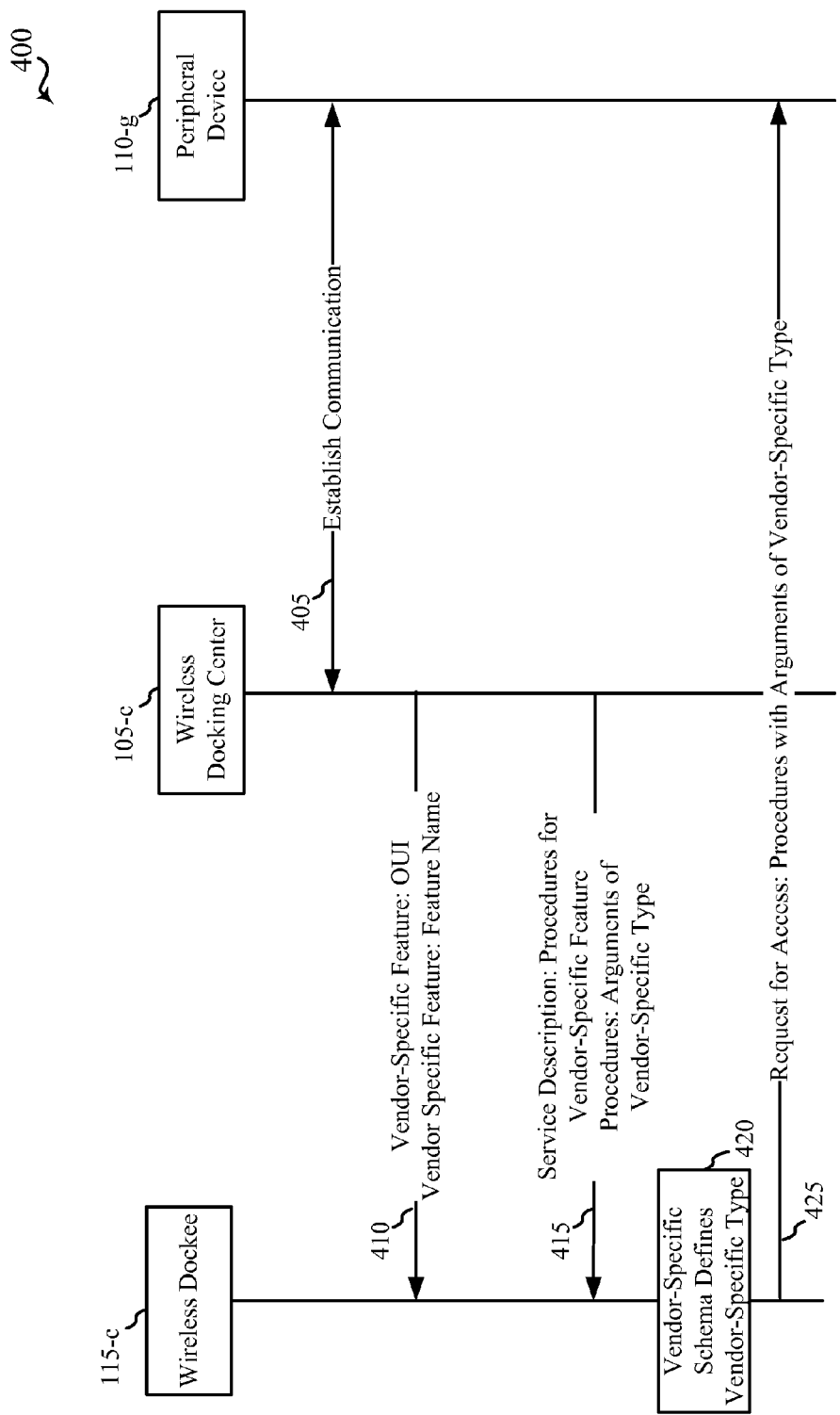
FIG. 4 shows a call flow diagram illustrating communication in a wireless communications system according to various aspects of the present disclosure.

FIG. 4 depicts a call flow diagram 400 illustrating communication in a wireless communications system according to various aspects of the present disclosure. The diagram 400 may illustrate aspects of the wireless communications systems 100 and 200 described with reference to FIGS. 1, 2 and 3. In particular, the diagram 400 may illustrate an example of details provided in the messages illustrated in FIG. 3. The diagram 400 includes a wireless docking center 105-*c*, a peripheral device 110-*g*, and a wireless dockee 115-*c*. Each of these may be examples of corresponding devices of wireless communications systems 100 and 200.

The wireless docking center 105-*c* may establish communication 405 with the peripheral device 110-*g*. The peripheral device 110-*g* may be external to or embedded in the wireless docking center 105-*c*. Upon establishing communication 405, the wireless docking center 105-*c* may determine that the peripheral device 110-*g* includes vendor-specific features. Thus, during pre-association discovery 410, the wireless docking center 105-*c* advertises the vendor-specific features available through peripheral device 110-*g*. As an example, the wireless docking center 105-*c* may advertise the vendor-specific features via an XML message using a complex XML type. The complex XML type may be referred to as "VendorSpecificFeatureType." The complex XML type may identify a list of supported vendor-specific features. The identification for each vendor-specific feature may include both a feature name (for example, a string element "FeatureName") and an identification of the vendor associated with the vendor-specific feature. The vendor identification may be, for example, an integer element "OUI" corresponding to the vendor's organization unique identifier (OUI), as assigned by the Wi-Fi Alliance (WFA).

Wireless dockee 115-c may detect the broadcast discovery information and may determine that the wireless dockee 115-c is compatible with the vendor (as determined by comparing, for example, the received OUI with a list of supported OUIs stored at the wireless dockee 115-c) and/or that the wireless dockee 115-c would benefit from using the advertised feature. If the wireless dockee 115-c is compatible with and/or would benefit from the advertised vendor-specific feature, the wireless dockee 115-c requests and receives from the wireless docking center 105-c (via, for example, UPnP) a service description 415 relating to the advertised vendor-specific feature. The service description 415 may identify the available procedures associated with the vendor-specific feature. For example, the service description 415 may be formatted as a complex XML type "VendorSpecificDataType" which may include a list of vendor-specific procedures or actions referred to as "VendorXyzAction," where "Xyz" denotes a particular vendor. Each identified action or procedure may include both an identifier of the associated vendor (such as an OUI) as well as vendor-specific information that pertains to the action (in the form of, for example, XML element "VendorSpecificInfo"). The vendor-specific information may include a common name (for example, the string "InfoName") which may denote a parameter associated with a procedure. When the parameter is of a vendor-specific type, the vendor-specific type may be included in the form of an XML extension (which may be referred to as, for example, "VendorXyzInfoType").

The vendor-specific type may be defined in a vendor-specific schema. The vendor-specific schema may be an XML schema and may be accessed by the wireless dockee 115-c (at box 420). Generally, as the wireless dockee 115-c has already determined that it is compatible with the vendor, the wireless dockee 115-c may already have a copy of the vendor-specific schema. Alternatively, the wireless dockee 115-c may gain access to the vendor-specific schema by contacting the vendor or some other source.

Using the received service description and the vendor-specific schema, the wireless dockee 115-c is able to generate an access request 425 that may be understood by the peripheral device 110-g. The access request 425 may be formatted to include a request for a vendor-specific procedure, as identified in the received service description. The access request 425 may also include parameters for the requested procedure, also as identified in the received service description. The parameters may be formatted in accordance with the vendor-specific type identified in the service description and defined in the vendor-specific schema.

Figure 5:
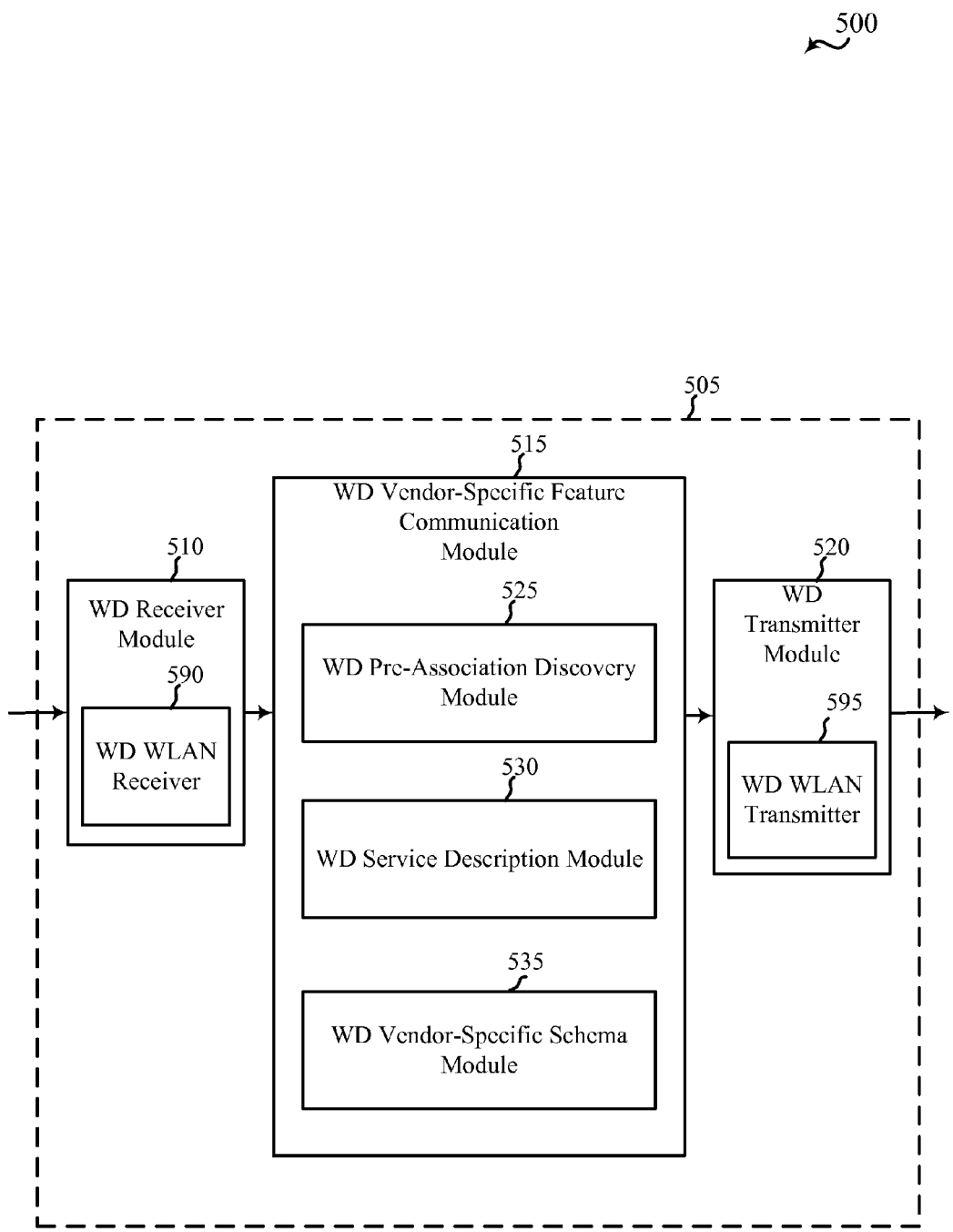
FIG. 5 shows a block diagram of an apparatus for communication in a wireless network according to various aspects of the present disclosure.

FIG. 5 shows a block diagram 500 of an apparatus 505 (e.g., a wireless dockee) for communication in a wireless network, in accordance with various aspects of the present disclosure. In some embodiments, the apparatus 505 may be an example of aspects of the wireless dockee (WD) 115 described with reference to FIG. 1, 2, 3 or 4. The apparatus 505 may also be a processor. The apparatus 505 may include a WD receiver module 510, a WD vendor-specific feature communication module 515, and/or a WD transmitter module 520. Each of these components may be in communication with each other.

The components of the apparatus 505 (as well as those of other related apparatus described herein) may, individually or collectively, be implemented using at least one application-specific integrated circuit (ASIC) adapted to perform some or all of the applicable functions in hardware. Alternatively, the functions may be performed by other processing units (or cores), on integrated circuits. In other embodiments, other types of integrated circuits may be used (e.g., Structured/Platform ASICs, field programmable gate arrays (FPGAs), and other Semi-Custom ICs), which may be programmed in any manner known in the art. The functions of each unit may also be implemented, in whole or in part, with instructions embodied in a memory, formatted to be executed by general or application-specific processors.

In some embodiments, the WD receiver module 510 may be or include a radio frequency (RF) receiver such as a WD WLAN receiver 590. The WD receiver module 510 may also include other receivers, such as a Wi-Fi receiver and/or a wireless wide area network (WWAN) receiver (e.g., a cellular receiver). The WD receiver module 510 may be used to receive various types of data and/or control signals (i.e., transmissions) over communication links (e.g., physical channels) of a wireless communications system such as the wireless communications systems 100, 200 described with reference to FIG. 1 or 2. For example, the WD receiver module 510 may be used to receive vendor-specific feature discovery information during pre-association discovery, as well as service descriptions related to the vendor-specific features.

In some embodiments, the WD transmitter module 520 may be or include an RF transmitter such as a WD WLAN transmitter 595. The WD transmitter module 520 may also include other transmitters, such as a Wi-Fi transmitter and/or a WWAN transmitter (e.g., a cellular transmitter). The WD transmitter module 520 may be used to transmit various types of data and/or control signals (i.e., transmissions) over communication links (e.g., physical channels) of a wireless communications system such as the wireless communications systems 100, 200 described with reference to FIG. 1 or 2. For example, the WD transmitter module 520 may be used to transmit access requests formatted in accordance with received service descriptions and vendor-specific schemas.

In some embodiments, the WD vendor-specific feature communication module 515 may be an example of a communication module that manages the vendor-specific communications described with reference to FIG. 2, 3 or 4. The WD vendor-specific feature communication module 515 may include a WD pre-association discovery module 525, a WD service description module 530, and/or a WD vendor-specific schema module 535. Each of these components may be in communication with each other.

In some examples, the WD pre-association discovery module 525 may be used to detect pre-association discovery broadcast by a wireless docking center (such as one of the wireless docking centers 105 described with reference to FIG. 1, 2, 3 or 4). During pre-association discovery, a wireless docking center may advertise vendor-specific features available through a connected peripheral device, and the WD pre-association discovery module 525 may detect these broadcasts (via, for example, WD receiver module 510). As an example, the WD pre-association discovery module 525 may detect the vendor-specific features via an XML message. The XML message may identify a list of supported vendor-specific features. The identification for each vendor-specific feature may include both a feature name and an identification of the vendor associated with the vendor-specific feature. The vendor identification may be, for example, the vendor's OUI. The WD pre-association discovery module 525 may compare the vendor identification received during pre-association discovery with its own list of vendor identifiers with which the apparatus 505 is compatible.

In some examples, the WD service description module 530 may be used to receive a service description from the wireless docking center with which the apparatus 505 had engaged in pre-association discovery. If the WD pre-association discovery module 525 determines that apparatus 505 is compatible with the vendor associated with a detected vendor-specific feature, the WD service description module 530 may coordinate a request for and the receipt of a service description related to the vendor-specific feature. The communication regarding the service description may be in the form of UPnP packets. The WD service description module 530 may receive a service description which may identify the available procedures associated with the vendor-specific feature. As an example, the service description may be formatted using XML and may include a list of vendor-specific procedures or actions. Each identified action or procedure may include both an identifier of the associated vendor (such as an OUI) as well as vendor-specific information that pertains to the action. The vendor-specific information may include parameters associated with a procedure. The parameters may be of different types, including of vendor-specific types, as identified using an XML extension, for example. The WD service description module 530 receives the procedures with identified parameters via the service description and then coordinates the use of this information for the eventual generation of an access request.

In some examples, the WD vendor-specific schema module 535 is used to match the parameter vendor-specific types identified by the service description received by the WD service description module 530. The WD vendor-specific schema module 535 coordinates the accessing of a vendor-specific schema to access the defined data structures of the vendor-specific types. The vendor-specific schema may be an XML schema and may be accessible on the apparatus 505. Alternatively, if the vendor-specific schema is not accessible on the apparatus 505, the WD vendor-specific schema module 535 may coordinate access to the vendor-specific schema by contacting the vendor or some other source.

The WD vendor-specific feature communication module 515 uses the service description received by the WD service description module 530 and the vendor-specific schema accessed by the WD vendor-specific schema module 535 to generate an access request for the desired procedure of the vendor-specific feature. The access request may be transmitted using, for example, the WD transmitter module 520.

Figure 6:
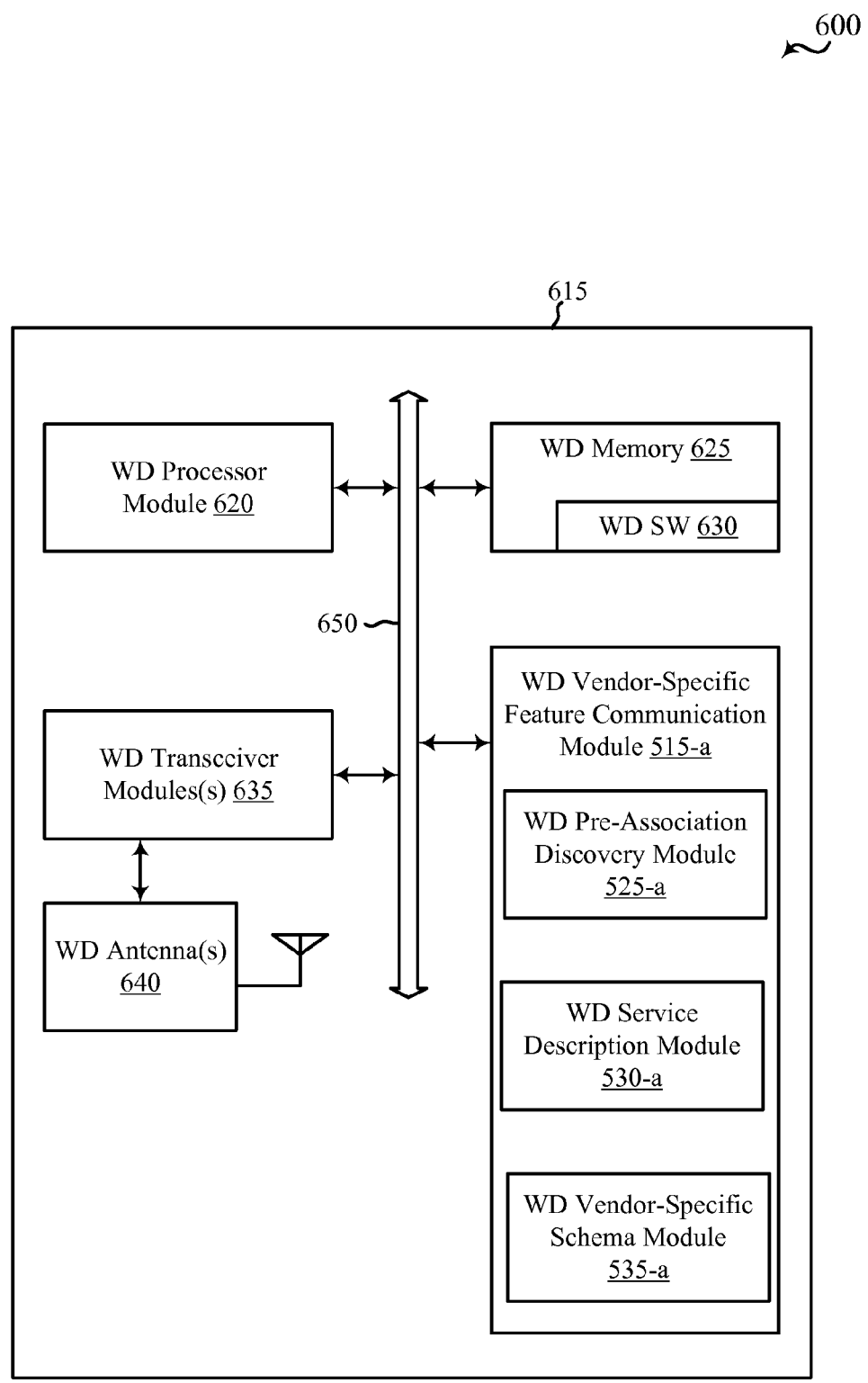
FIG. 6 shows a block diagram of a wireless device for communication in a wireless network according to various aspects of the present disclosure.

FIG. 6 shows a block diagram 600 of a wireless device 615 (e.g., a mobile device) for wireless communication, in accordance with various aspects of the present disclosure. The wireless device 615 may have various configurations and may be or be part of a computer (e.g., a laptop computer, netbook computer, tablet computer, etc.), a cellular telephone, a personal digital assistant (PDA), a digital video recorder (DVR), an internet appliance, a gaming console, an e-reader, etc. The wireless device 615 may in some cases have an internal power supply (not shown), such as a small battery, to facilitate mobile operation. In some embodiments, the wireless device 615 may be an example of aspects of the wireless dockee 115 described with reference to FIG. 1, 2, 3 or 4, and/or aspects of the apparatus 505 described with reference to FIG. 5. The wireless device 615 may implement at least some of the features and functions described with reference to FIG. 1, 2, 3, 4 or 5. The wireless device 615 may communicate with wireless docking centers 105 described with reference to FIG. 1, 2, 3 or 4.

The wireless device 615 may include a WD processor module 620, a WD memory module 625 (including WD software (SW) code 630), at least one transceiver (represented by WD transceiver module(s) 635), at least one antenna (represented by WD antenna(s) 640), and/or a WD vendor-specific feature communication module 515-a. Each of these components may be in communication with each other, directly or indirectly, over at least one bus 650.

The WD transceiver module(s) 635, in conjunction with WD antenna(s) 640, may facilitate wireless communication with wireless docking centers and/or other apparatuses. Wireless communication with a wireless docking center, as described above, may be managed using the WD vendor-specific feature communication module 515-a.

The WD processor module 620 may include an intelligent hardware device, e.g., a central processing unit (CPU), a microcontroller, an ASIC, etc. The WD processor module 620 may process information received through the WD transceiver module(s) 635 and/or process information to be sent to the WD transceiver module(s) 635 for transmission through the WD antenna(s) 640. The WD processor module 620 may handle, alone or in connection with the WD vendor-specific feature communication module 515-a, various aspects of communicating over a wireless and/or wireline communication system.

The WD memory module 625 may include random access memory (RAM) and/or read-only memory (ROM). The WD memory module 625 may store computer-readable, computer-executable WD software (SW) code 630 containing instructions that may, when executed, cause the WD processor module 620 to perform various functions described herein for communicating over a wireless communications system. Alternatively, the WD SW code 630 may not be directly executable by the WD processor module 620 but may cause the wireless device 615 (e.g., when compiled and executed) to perform various functions described herein.

The WD vendor-specific feature communication module 515-a may be an example of aspects of the WD vendor-specific feature communication module 515 described with reference to FIG. 5. The WD vendor-specific feature communication module 515-a may be used to manage the wireless connection(s) of the wireless device 615 as they relate to vendor-specific features available on a peripheral device and supported by wireless docking centers. In some embodiments, the WD vendor-specific feature communication module 515-a may include a WD pre-association discovery module 525-a (which may be an example of the WD pre-association discovery module 525 described with respect to FIG. 5), a WD service description module 530-a (which may be an example of the WD service description module 530 described with respect to FIG. 5), and/or a WD vendor-specific schema module 535-a (which may be an example of the WD vendor-specific schema module 535 described with respect to FIG. 5). Each of these components may be in communication with each other and may perform the functions described above with respect to FIG. 5.

In some embodiments, the WD vendor-specific feature communication module 515-a, or portions of same, may include a processor, and/or some or all of the functionality of the WD vendor-specific feature communication module 515-a may be performed by the WD processor module 620 and/or in connection with the WD processor module 620.

Figure 7:
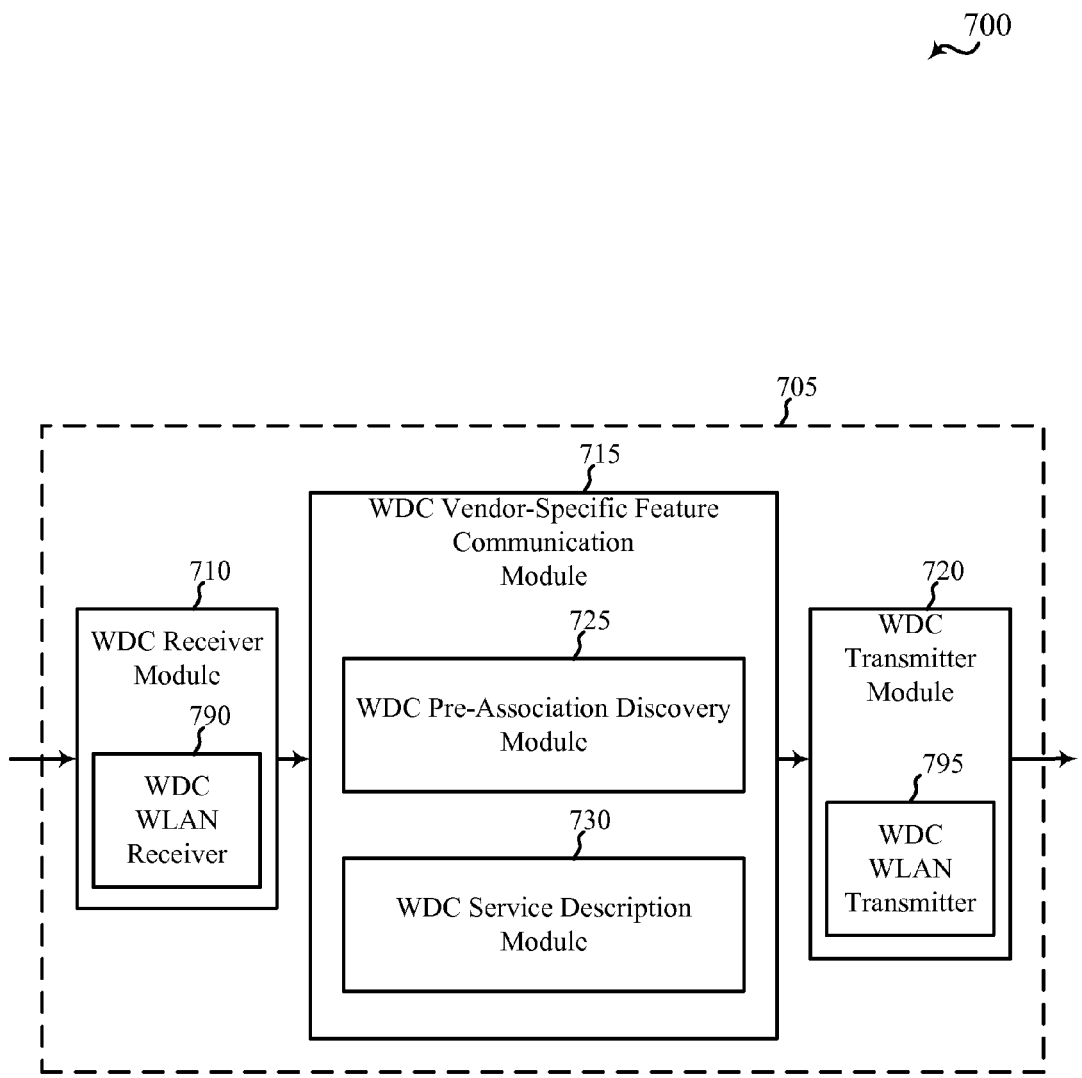
FIG. 7 shows a block diagram of an apparatus for communication in a wireless network according to various aspects of the present disclosure.

Next, FIG. 7 shows a block diagram of an apparatus 705 for communication in a wireless network according to various aspects of the present disclosure. The apparatus 705 may be a wireless docking center, and it may be an example of the wireless docking centers 105 described with reference to FIG. 1, 2, 3 or 4. The apparatus 705 may include a WDC receiver module 710, a WDC vendor-specific feature communication module 715, and a WDC transmitter module 720. Each of the modules may be in communication with one another. In some embodiments, the apparatus 705 is a processor.

In some embodiments, the WDC receiver module 710 may be or include an RF receiver such as a WDC WLAN receiver 790. The WDC receiver module 710 may also include other receivers, such as a Wi-Fi receiver and/or a WWAN receiver (e.g., a cellular receiver). The WDC receiver module 710 may be used to receive various types of data and/or control signals (i.e., transmissions) over communication links (e.g., physical channels) of a wireless communications system such as the wireless communications systems 100, 200 described with reference to FIG. 1 or 2. For example, the WDC receiver module 710 may be used to receive vendor-specific feature discovery information from a peripheral device, as well as a request from a wireless dockee for a service description related to vendor-specific features available on the peripheral device.

In some embodiments, the WDC transmitter module 720 may be or include an RF transmitter such as a WDC WLAN transmitter 795. The WDC transmitter module 720 may also include other transmitters, such as a Wi-Fi transmitter and/or a WWAN transmitter (e.g., a cellular transmitter). The WDC transmitter module 720 may be used to transmit various types of data and/or control signals (i.e., transmissions) over communication links (e.g., physical channels) of a wireless communications system such as the wireless communications systems 100, 200 described with reference to FIG. 1 or 2. For example, the WDC transmitter module 720 may be used to broadcast vendor-specific information during pre-association discovery as well as to transmit service descriptions related to the vendor-specific information.

In some embodiments, the WDC vendor-specific feature communication module 715 may be an example of a communication module that manages the vendor-specific communications described with reference to FIG. 2, 3 or 4. The WDC vendor-specific feature communication module 715 may include a WDC pre-association discovery module 725, and/or a WDC service description module 730. Each of these components may be in communication with each other.

In some examples, the WDC pre-association discovery module 725 may be used to broadcast pre-association discovery. The information broadcast in the pre-association discovery may be vendor-specific information received from a connected peripheral device (such as one of the peripheral devices 110 described with reference to FIG. 1, 2, 3 or 4). The WDC pre-association discovery module 725 may broadcast the vendor-specific information in the form of pre-association discovery to be detected by, for example, a wireless dockee (such as one of the wireless dockees 115 described with reference to FIG. 1, 2, 3 or 4). As an example, the WDC pre-association discovery module 725 may broadcast the vendor-specific features via an XML message. The XML message may identify a list of supported vendor-specific features. The identification for each vendor-specific feature may include both a feature name and an identification of the vendor associated with the vendor-specific feature. The vendor identification may be, for example, the vendor's OUI.

In some examples, the WDC service description module 730 may be used to receive a request for a service description from a wireless dockee and to transmit the requested service description. A wireless dockee may request a service description after detecting a vendor-specific feature in a peripheral device connected to the apparatus 705. In response to the request, the WDC service description module 730 may transmit the service description to the wireless dockee. The communication regarding the service description may be in the form of UPnP packets. The transmitted service description may identify the available procedures associated with a vendor-specific feature. As an example, the service description may be formatted using XML and may include a list of vendor-specific procedures or actions. Each identified action or procedure may include both an identifier of the associated vendor (such as an OUI) as well as vendor-specific information that pertains to the action. The vendor-specific information may include parameters associated with a procedure. The parameters may be of different types, including vendor-specific types, as identified using an XML extension, for example.

Figure 8:
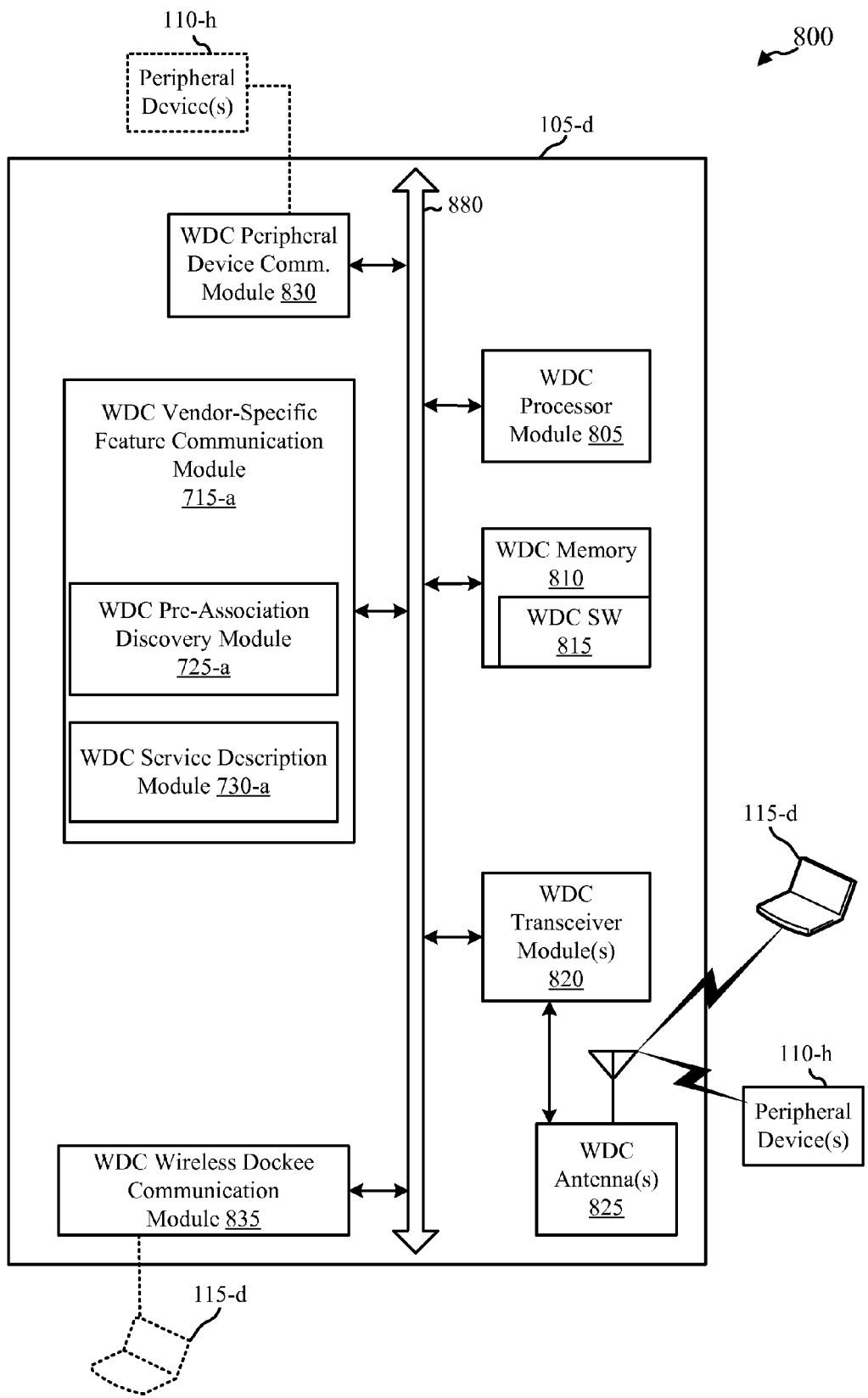
FIG. 8 shows a block diagram of a wireless communications system according to various aspects of the present disclosure.

Turning now to FIG. 8, which depicts a wireless communications system 800 according to various aspects of the present disclosure. The wireless communications system 800 may include a wireless docking center 105-d, peripheral devices 110-h, and wireless dockees 115-d. The peripheral devices 110-h may be external to the wireless docking center 105-d; but in some cases the peripheral devices 110-h are embedded in the wireless docking center 105-d. The wireless docking center 105-d may be an example of the wireless docking centers 105 described with reference to the preceding FIG. 1, 2, 3 or 4, and/or the apparatus 705 described with reference to FIG. 7. The wireless docking center 105-d may include a WDC processor module 805, a WDC memory module 810 (including WDC software module 815), a WDC transceiver module 820, WDC antenna(s) 825, a WDC peripheral device communication module 830, a WDC wireless dockee communication module 835, and a WDC vendor-specific feature communication module 715-a.

The WDC transceiver module 820, in conjunction with WDC antenna(s) 825 may facilitate wireless transmission with wireless dockees 115-d and/or peripheral device(s) 110-h. Additionally or alternatively, the WDC peripheral device communication module 830 may facilitate wireline communication with the peripheral devices 110-h. In some embodiments, the WDC wireless dockee communication module 835 facilitates wireline communications with a wireless dockee 115-d. For example, a wireless dockee 115-d may be temporarily connected via wireline to the wireless docking center 105-d for certain synchronization operations.

In some embodiments, the wireless docking station 105-d includes a WDC vendor-specific feature communication module 715-a. The WDC vendor-specific feature communication module 715-a may perform substantially the same functions as the corresponding module described with reference to FIG. 7. By way of example, WDC vendor-specific feature communication module 715-a may include a WDC pre-association discovery module 725-a and/or a WDC service description module 730-a. The WDC pre-association discovery module 725-a may receive and broadcast vendor-specific features available on connected peripheral device(s) 110-h. The WDC service description module 730-a may transmit to a requesting wireless dockee 115-d a service description corresponding to the vendor-specific features advertised by the WDC pre-association discovery module 725-a.

The WDC memory module 810 may include RAM and ROM. The WDC memory module 810 may store computer-readable, computer-executable WDC software/firmware code 815 containing instructions that may, when executed, cause the WDC processor module 805 to perform various functions described herein (e.g., requesting, receiving, and transmitting vendor-specific feature information, etc.). Alternatively, the WDC software/firmware code 815 may not be directly executable by the WDC processor module 805 but may cause a computer (e.g., when compiled and executed) to perform functions described herein. The WDC processor module 805 may include an intelligent hardware device, e.g., a CPU, a microcontroller, an ASIC, etc.

Each of the modules of the wireless docking center 105-*d* may be in communication with each other, for example via at least one communication bus 880.

Figure 9:
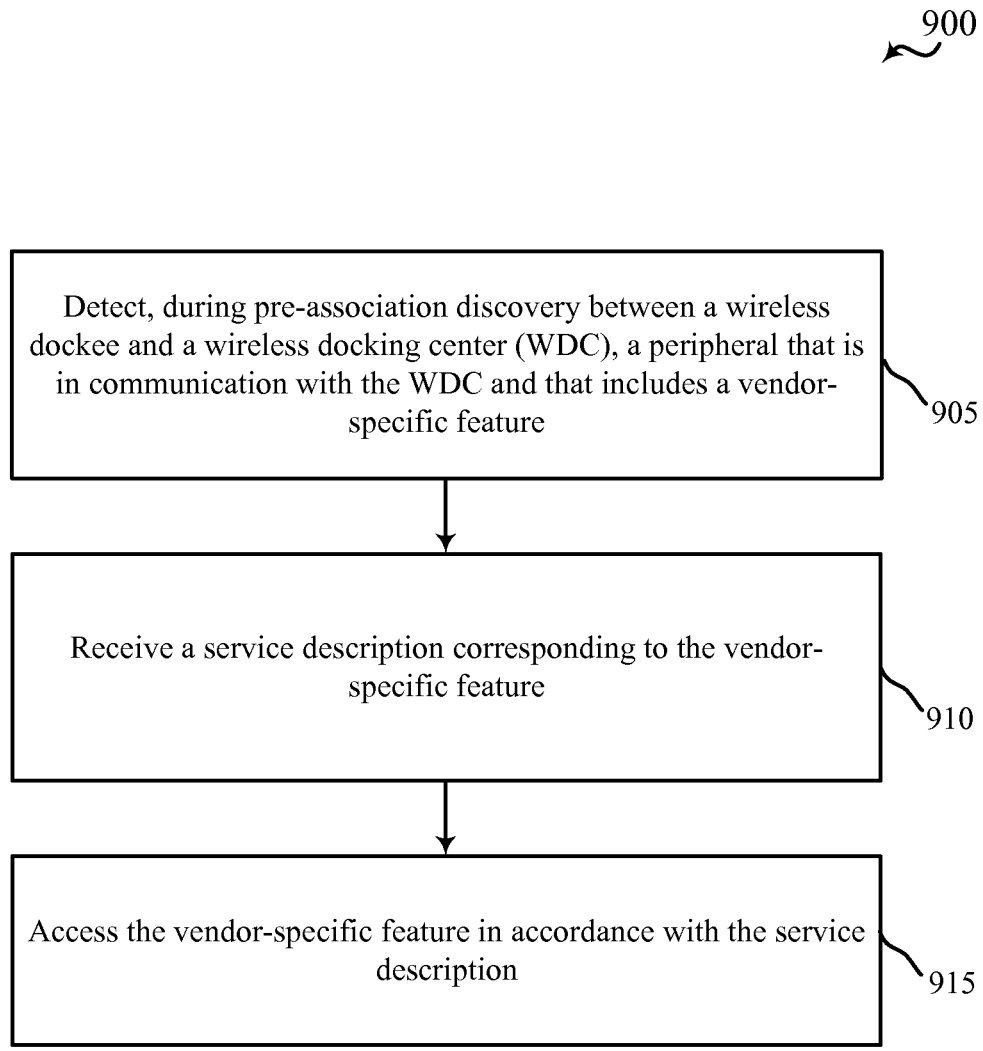
FIGS. 9-12 show flowchart diagrams of illustrative methods for wireless communications according to various aspects of the present disclosure.

FIG. 9 shows a flowchart diagram of an illustrative method 900 for wireless communications according to at least one aspect of the principles described above. The method 900 may be implemented by at least one of the wireless dockees 115 described above with reference to FIG. 1, 2, 3, 4, 6 or 8 and/or apparatus 505 of FIG. 5. In some examples, a wireless dockee such as one of the wireless dockees 115 or an apparatus such as apparatus 505 may execute sets of codes to control the functional elements of the wireless dockee or apparatus to perform the functions described below.

At block 905, the method 900 may include detecting, during pre-association discovery between a wireless dockee and a wireless docking center, a peripheral device that is in communication with the wireless docking center and that includes a vendor-specific feature. The detected vendor-specific feature may be detected during pre-association discovery 310, 410, as described above with reference to FIG. 3 or 4, respectively.

At block 910, the method 900 may include receiving a service description corresponding to the vendor-specific feature. For example, the received service description may be received via message 320, 415, as described above with reference to FIG. 3 or 4, respectively.

At block 915, the method 900 may include accessing the vendor-specific feature in accordance with the service description. For example, the wireless dockee may send an access request 330, 425, as described above with reference to FIG. 3 or 4, respectively.

In some embodiments, the operations at blocks 905, 910 or 915 may be performed using the WD vendor-specific feature communication module 515 described with reference to FIG. 5 or 6. Nevertheless, it should be noted that the method 900 is just one implementation and that the operations of the method 900 may be rearranged or otherwise modified such that other implementations are possible.

Figure 10:
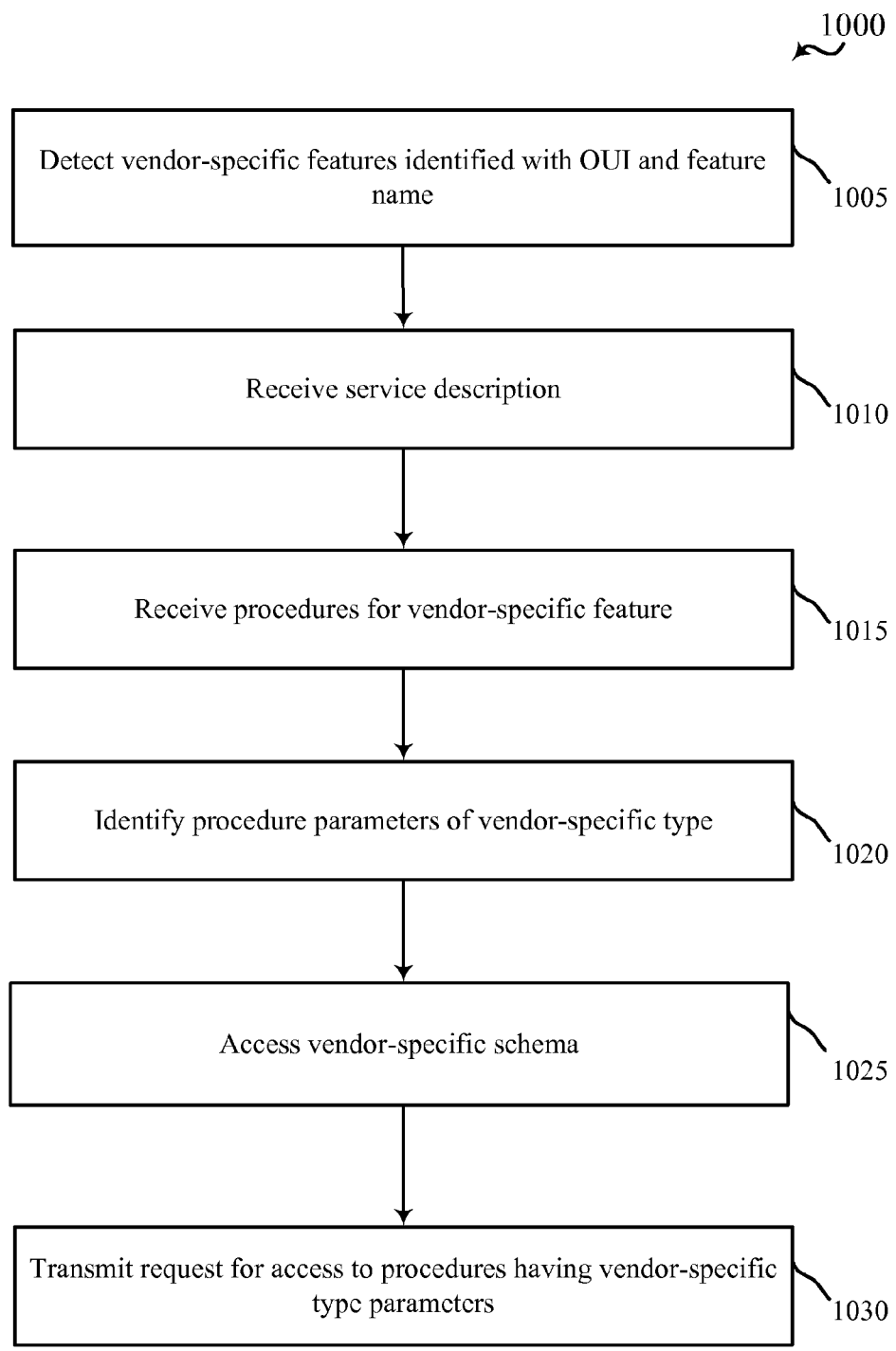

FIG. 10 shows a flowchart diagram of an illustrative method 1000 for wireless communications according to at least one aspect of the principles described above. The method 1000 may be implemented by at least one of the wireless dockees 115 described above with reference to FIG. 1, 2, 3, 4, 6 or 8 and/or apparatus 505 of FIG. 5. In some examples, a wireless dockee such as one of the wireless dockees 115 or an apparatus such as apparatuses 505 may execute sets of codes to control the functional elements of the wireless dockee or apparatus to perform the functions described below.

At block 1005, the method 1000 may include detecting vendor-specific features. The vendor-specific features are detected during pre-association discovery between the wireless dockee and a wireless docking center. The detected vendor-specific features relate to a peripheral device that is in communication with the wireless docking center. The vendor-specific features may be identified by both a feature name and a vendor identifier such as an OUI, as described with relation to pre-association discovery 410, described above with reference to FIG. 4.

At block 1010, the method 1000 may include receiving a service description. The service description may correspond to the vendor-specific feature. For example, the received service description 415 may be received via a UPnP message, as described above with reference to FIG. 4. The service description may include procedures related to the detected vendor-specific feature. Thus, at block 1015, the method 1000 may include receiving the vendor-specific feature procedures. The service description may include a vendor identifier for each procedure, such as an OUI, as well as vendor-specific parameters. Therefore, at block 1020, the method 1000 may include identifying the parameters for the vendor-specific procedures, where the parameters are of a vendor-specific type. The parameters may include, then, a name as well as a vendor-specific type.

At block 1025, the method 1000 may include accessing a vendor-specific schema in order, for example, to understand the type or data structure of the parameters of vendor-specific type. The vendor-specific schema may be accessible on the wireless dockee itself or may need to be obtained from the vendor or elsewhere. For example, the wireless dockee may access a vendor-specific schema in accordance with the descriptions above relating to box 420 of FIG. 4.

At block 1030, the method 1000 may include transmitting a request for access to the procedures associated with the vendor-specific features. The access request may include parameters structured in accordance with the vendor-specific type information obtained from the vendor-specific schema. For example, the wireless dockee may send an access request 425 as described above with reference to FIG. 4.

In some embodiments, the operations at blocks 1005, 1010, 1015, 1020, 1025 or 1030 may be performed using the WD vendor-specific feature communication module 515 described with reference to FIG. 5 or 6. Nevertheless, it should be noted that the method 1000 is just one implementation and that the operations of the method 1000 may be rearranged or otherwise modified such that other implementations are possible.

Figure 11:
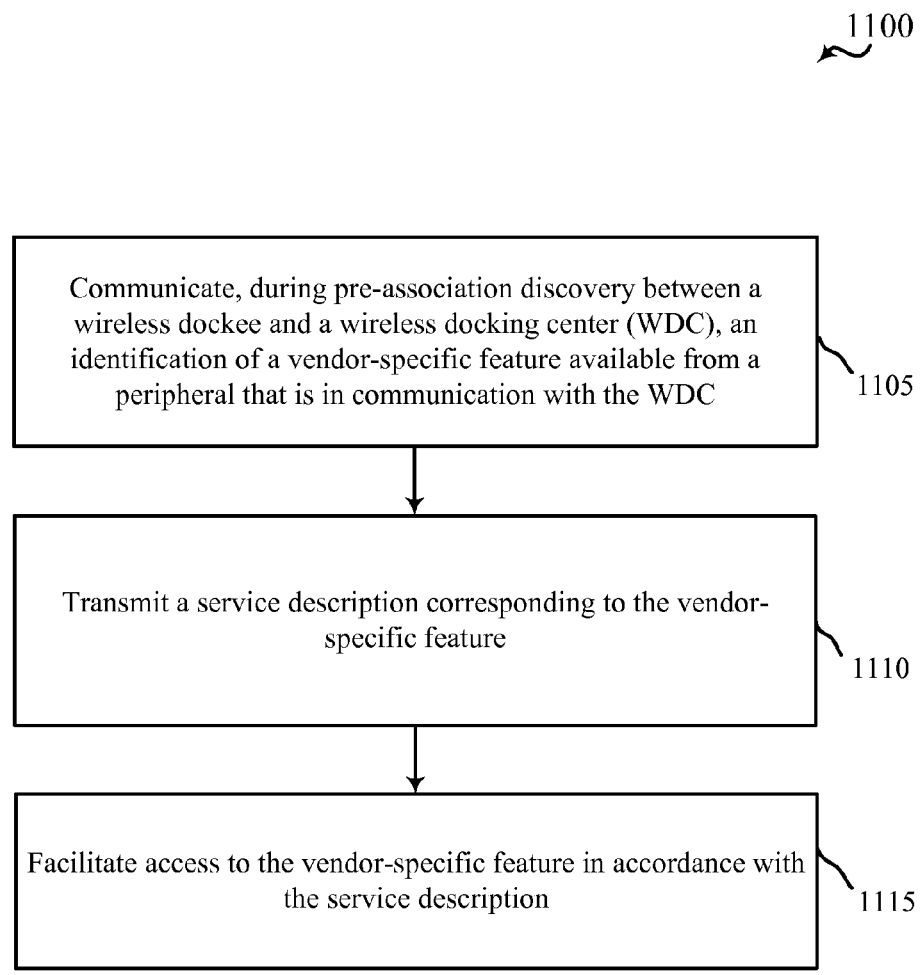

FIG. 11 shows a flowchart diagram of an illustrative method 1100 for wireless communications according to at least one aspect of the principles described above. The method 1100 may be implemented by at least one of the wireless docking centers 105 described above with reference to FIG. 1, 2, 3, 4 or 8 and/or apparatus 705 of FIG. 7. In some examples, a wireless docking center such as one of the wireless docking centers 105 or an apparatus such as apparatus 705 may execute sets of codes to control the functional elements of the wireless docking center or apparatus to perform the functions described below.

At block 1105, the method 1100 may include communicating, during pre-association discovery between a wireless dockee and a wireless docking center, an identification of a vendor-specific feature available from a peripheral device that is in communication with the wireless docking center. The vendor-specific feature identification may be communicated during pre-association discovery 310, 410, as described above with reference to FIG. 3 or 4, respectively.

At block 1110, the method 1100 may include transmitting a service description corresponding to the vendor-specific feature. For example, the transmitted service description may be transmitted via message 320, 415, as described above with reference to FIG. 3 or 4, respectively.

At block 1115, the method 1100 may include facilitating access by a wireless dockee of the vendor-specific feature in accordance with the service description. For example, the wireless dockee may send an access request 330, 425, via the wireless docking center, as described above with reference to FIG. 3 or 4, respectively.

In some embodiments, the operations at blocks 1105, 1110 or 1115 may be performed using the WDC vendor-specific feature communication module 715 described with reference to FIG. 7 or 8. Nevertheless, it should be noted that the method 1100 is just one implementation and that the operations of the method 1100 may be rearranged or otherwise modified such that other implementations are possible.

Figure 12:
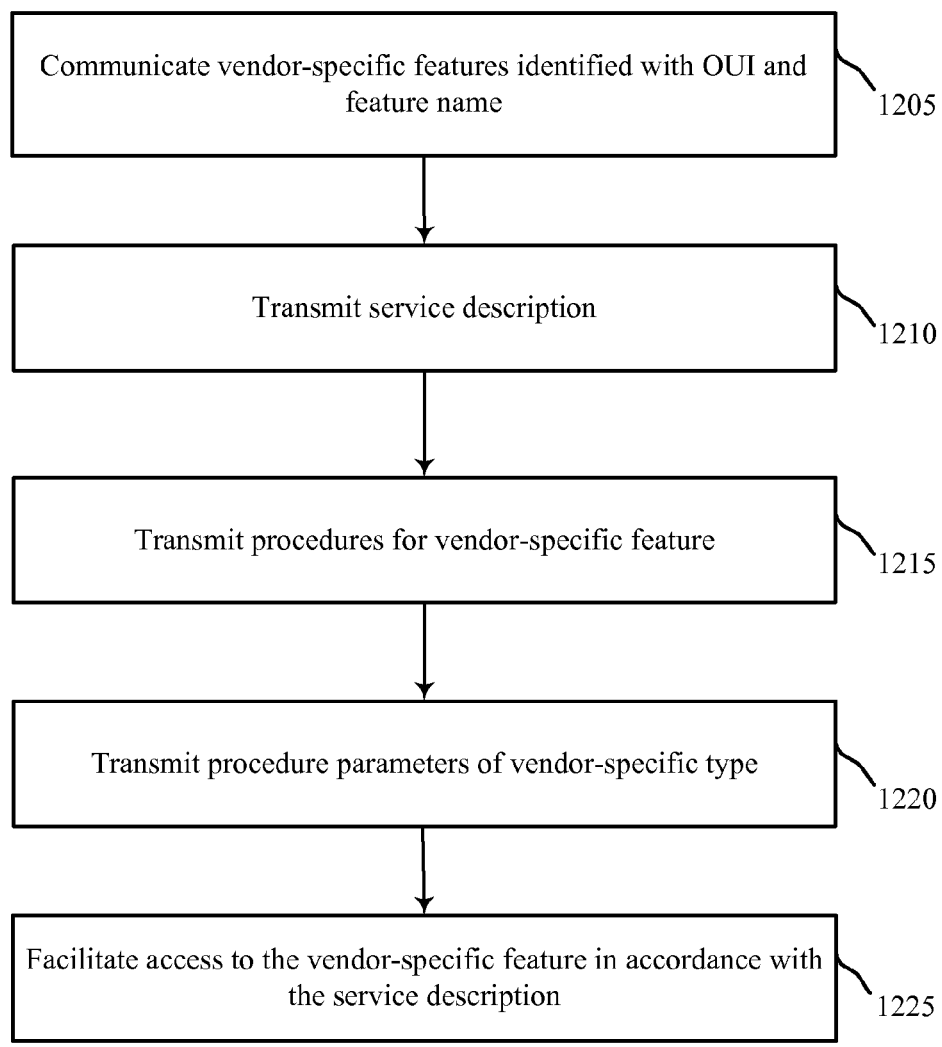

FIG. 12 shows a flowchart diagram of an illustrative method 1200 for wireless communications according to at least one aspect of the principles described above. The method 1200 may be implemented by at least one of the wireless docking centers 105 described above with reference to FIG. 1, 2, 3, 4 or 8 and/or apparatus 705 of FIG. 7. In some examples, a wireless docking center such as one of the wireless docking centers 105 or a device such as apparatus 705 may execute sets of codes to control the functional elements of the wireless docking center or device to perform the functions described below.

At block 1205, the method 1200 may include communicating vendor-specific features. The vendor-specific features may be communicated during pre-association discovery between the wireless docking center and a wireless dockee. The communicated vendor-specific features relate to a peripheral device that is in communication with the wireless docking center. The vendor-specific features may be identified by both a feature name and a vendor identifier such as an OUI, as described with relation to pre-association discovery 410, described above with reference to FIG. 4.

At block 1210, the method 1200 may include transmitting a service description. The service description may correspond to the vendor-specific feature. For example, the transmitted service description 415 may be transmitted via a UPnP message, as described above with reference to FIG. 4. The service description may include procedures related to the detected vendor-specific feature. Thus, at block 1215, the method 1200 may include transmitting the vendor-specific feature procedures. The service description may include a vendor identifier for each procedure, such as an OUI, as well as vendor-specific parameters. Therefore, at block 1220, the method 1200 may include transmitting an identification of the parameters for the vendor-specific procedures, where the parameters are of a vendor-specific type. The parameters may include, then, a name as well as a vendor-specific type.

At block 1225, the method 1200 may include facilitating access by the wireless dockee to the vendor-specific feature. In accordance with the service description transmitted by the wireless docking center, the wireless dockee may transmit an access request to the peripheral device that includes the vendor-specific feature. The access request may be transmitted via the wireless docking center. For example, the wireless dockee may send an access request 425 as described above with reference to FIG. 4.

In some embodiments, the operations at blocks 1205, 1210, 1215, 1220 or 1225 may be performed using the WDC vendor-specific feature communication module 715 described with reference to FIG. 7 or 8. Nevertheless, it should be noted that the method 1200 is just one implementation and that the operations of the method 1200 may be rearranged or otherwise modified such that other implementations are possible.

The detailed description set forth above in connection with the appended drawings describes exemplary embodiments and does not represent the only embodiments that may be implemented or that are within the scope of the claims. The term "example" or "exemplary," when used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the terms "apparatus" and "device" are interchangeable.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method of wireless communication, comprising:
   receiving, at a wireless dockee during pre-association discovery between the wireless dockee and a wireless docking center (WDC) and prior to connecting with the WCD, a feature identifier that identifies a vendor-specific feature of a peripheral device that is in communication with the WDC, wherein the vendor-specific feature corresponds to a function of the peripheral device and is different from a generic feature of the peripheral device;
   determining, by the wireless dockee, that the wireless dockee is compatible with the vendor-specific feature;
   establishing a connection with the WDC based at least in part on the determining that the wireless dockee is compatible with the vendor-specific feature;
   receiving a service description that identifies at least one procedure associated with the vendor-specific feature; and
   enabling access to the vendor-specific feature in accordance with the service description.

2. The method of claim 1, further comprising:
   receiving, during the pre-association discovery, the feature identifier and a vendor identifier which identifies a vendor associated with the vendor-specific feature.

3. The method of claim 2, wherein the vendor identifier comprises an organization unique identifier (OUI) of the vendor.

4. The method of claim 2, wherein the vendor identifier and the feature identifier are received in an extensible markup language (XML) format.

5. The method of claim 1, wherein the service description comprises a Universal Plug and Play (UPnP) service description.

6. The method of claim 1, wherein the at least one procedure associated with the vendor-specific feature is based on a vendor-specific data type.

7. The method of claim 1, wherein the at least one procedure associated with the vendor-specific feature includes parameters that identify a vendor associated with the at least one procedure.

8. The method of claim 7, wherein the vendor is identified by an organization unique identifier (OUI).

9. The method of claim 1, further comprising:
   receiving, as part of the service description, a procedure associated with the vendor-specific feature that is based on a vendor-specific data type.

10. The method of claim 9, further comprising:
    accessing, by the wireless dockee, a schema that defines the vendor-specific data type, and
    wherein enabling access to the vendor-specific feature comprises enabling access to the vendor-specific feature in accordance with the service description and the schema that defines the vendor-specific data type.

11. The method of claim 10, wherein the vendor-specific data type is defined using extensible markup language (XML).

12. The method of claim 10, wherein the vendor-specific data type is defined to include a generic element and a vendor-specific element.

13. The method of claim 10, wherein the vendor-specific data type is defined to include a vendor identifier.

14. The method of claim 13, wherein the vendor identifier is an organization unique identifier (OUI) of a vendor.

15. The method of claim 10, further comprising:
    generating a Universal Plug and Play (UPnP) packet based on the schema.

16. The method of claim 15, wherein the UPnP packet is used to access the vendor-specific feature.

17. The method of claim 1, further comprising:
    comparing a set of vendor-specific features supported by the wireless dockee with a set of vendor-specific features supported by the WDC to determine a set of vendor-specific peripheral device features supported by both the wireless dockee and the WDC.

18. A wireless dockee for wireless communication, comprising:
    at least one processor;
    a memory coupled to the at least one processor;
    a receiver to receive, during pre-association discovery between the wireless dockee and a wireless docking center (WDC) and prior to connecting with the WCD, a feature identifier that identifies a vendor-specific feature of a peripheral device that is in communication with the WDC, wherein the vendor-specific feature corresponds to a function of the peripheral device and is different from a generic feature of the peripheral device, and to receive and store in the memory a service description that identifies at least one procedure associated with the vendor-specific feature;
    a discovery module to determine that the wireless dockee is compatible with the vendor-specific feature; and
    a transmitter to establish a connection with the WDC based at least in part on determining that the wireless dockee is compatible with the vendor-specific feature and to transmit an access request to the peripheral device via the WDC to access the vendor-specific feature in accordance with the service description.

19. A method of wireless communication, comprising:
    communicating, from a wireless docking center (WDC) during pre-association discovery between a wireless dockee and the WDC prior to connecting with the wireless dockee, a feature identifier that identifies a vendor-specific feature of a peripheral device that is in communication with the WDC, wherein the vendor-specific feature corresponds to a function of the peripheral device and is different from a generic feature of the peripheral device;

transmitting a service description that identifies a vendor-specific data type and at least one procedure associated with the vendor-specific feature based at least in part on a determination that the wireless dockee is compatible with the vendor-specific feature; and facilitating access to the vendor-specific feature in accordance with the service description.

20. The method of claim 19, further comprising:

communicating, during the pre-association discovery, the feature identifier and a vendor identifier which identifies a vendor associated with the vendor-specific feature.

21. The method of claim 20, wherein the vendor identifier comprises an organization unique identifier (OUI) of the vendor.

22. The method of claim 20, wherein the vendor identifier and the feature identifier are received in an extensible markup language (XML) format.

23. The method of claim 19, wherein the service description comprises a Universal Plug and Play (UPnP) service description.

24. The method of claim 19, wherein the at least one procedure associated with the vendor-specific feature is based on the vendor-specific data type.

25. The method of claim 19, wherein the at least one procedure associated with the vendor-specific feature includes parameters that identify a vendor associated with the at least one procedure.

26. The method of claim 25, wherein the vendor is identified by an organization unique identifier (OUI).

27. A wireless docking center (WDC) for wireless communication, comprising:

at least one processor;

a memory coupled to the at least one processor; and a transmitter to communicate, from the WDC during pre-association discovery between a wireless dockee and the WDC and prior to connecting with the wireless dockee, a vendor-specific feature of a peripheral device that is in communication with the WDC, wherein the vendor specific feature corresponds to a function of the peripheral device and is different from a generic feature of the peripheral device, and to transmit a service description that identifies a vendor-specific data type and at least one procedure associated with the vendor-specific feature based at least in part on a determination that the wireless dockee is compatible with the vendor-specific feature.

\* \* \* \* \*